(12) United States Patent
Beyer et al.

(10) Patent No.: US 10,547,513 B2
(45) Date of Patent: Jan. 28, 2020

(54) METHOD AND APPARATUS FOR DETERMINING A NETWORK TOPOLOGY OF A HIERARCHICAL NETWORK

(71) Applicant: Siemens Aktiengesellschaft, München (DE)

(72) Inventors: Dagmar Beyer, München (DE); Denis Krompaß, München (DE); Sigurd Spieckermann, Neukeferloh (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 15/767,209

(22) PCT Filed: Dec. 8, 2015

(86) PCT No.: PCT/EP2015/079011
§ 371 (c)(1),
(2) Date: Apr. 10, 2018

(87) PCT Pub. No.: WO2017/097346
PCT Pub. Date: Jun. 15, 2017

(65) Prior Publication Data
US 2019/0075027 A1    Mar. 7, 2019

(51) Int. Cl.
*H04L 12/24* (2006.01)
*H04L 12/26* (2006.01)
*H04L 29/08* (2006.01)

(52) U.S. Cl.
CPC .......... *H04L 41/12* (2013.01); *H04L 43/0817* (2013.01); *H04L 67/1089* (2013.01)

(58) Field of Classification Search
CPC .... H02J 13/0055; H02J 2003/007; H02J 3/00; H04L 41/064; H04L 41/065;
(Continued)

(56) References Cited

U.S. PATENT DOCUMENTS

| | | | |
|---|---|---|---|
| 9,641,452 B2* | 5/2017 | Lu | H04L 47/788 |
| 2006/0080417 A1* | 4/2006 | Boutboul | H04L 41/12 |
| | | | 709/220 |

(Continued)

FOREIGN PATENT DOCUMENTS

AU    2012241193 A1    11/2012

OTHER PUBLICATIONS

PCT International Search Report and Written Opinion for PCT International Application No. PCT/EP2015/079011, dated Aug. 4, 2016.

*Primary Examiner* — Stephen J Clawson
(74) *Attorney, Agent, or Firm* — Schmeiser, Olsen & Watts LLP

(57) ABSTRACT

A method and apparatus for determining a network topology of a hierarchical network, the apparatus including: a memory unit to store an outage state matrix representing an outage state of leaf nodes at the lowest hierarchical level of the hierarchical network; and a processing unit to decompose the stored state matrix into a first probability matrix indicating for each inner node of the hierarchical network the probability that the respective inner node forms the origin of an outage at the lowest hierarchical level of the hierarchical network and into a second probability matrix indicating for each leaf node at the lowest hierarchical level of the hierarchical network the probability that an inner node forms a hierarchical superordinate node of the respective leaf node at the lowest hierarchical level of the hierarchical network, wherein the decomposed second probability matrix is evaluated by the processing unit to determine the network topology.

15 Claims, 2 Drawing Sheets

Figure 1:
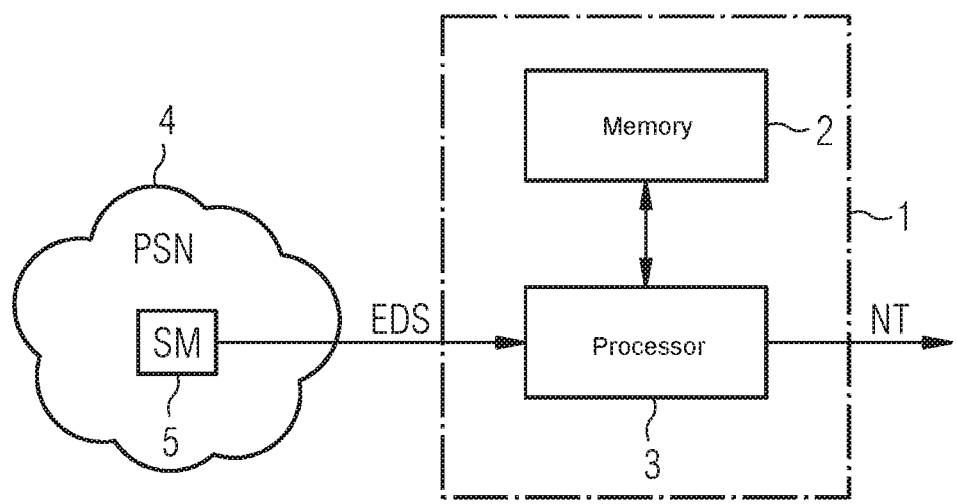

(58) Field of Classification Search
CPC ... H04L 41/0677; H04L 41/12; H04L 41/142; H04L 41/22; H04L 43/0817; H04L 67/1089; Y02E 60/76; Y04S 40/164; Y04S 40/166; Y04S 40/22
See application file for complete search history.

(56) References Cited

U.S. PATENT DOCUMENTS

| | | | |
|---|---|---|---|
| 2008/0025227 A1* | 1/2008 | Puttu | H04L 12/1895 370/244 |
| 2009/0024549 A1* | 1/2009 | Johnson | H04L 43/00 706/46 |
| 2011/0107155 A1 | 5/2011 | Hirose et al. | |
| 2012/0120790 A1* | 5/2012 | Berkowitz | H02H 7/30 370/225 |
| 2013/0346057 A1* | 12/2013 | Lin | H02J 3/00 703/18 |
| 2014/0129746 A1 | 5/2014 | Zhou et al. | |
| 2014/0129876 A1 | 5/2014 | Addepalli et al. | |
| 2014/0198630 A1* | 7/2014 | Nof | H04L 45/28 370/216 |
| 2015/0006946 A1* | 1/2015 | Littlefield | H04L 41/0686 714/4.1 |

* cited by examiner

METHOD AND APPARATUS FOR DETERMINING A NETWORK TOPOLOGY OF A HIERARCHICAL NETWORK

CROSS-REFERENCE TO RELATED APPLICATIONS

This application claims priority to PCT Application No. PCT/EP2015/079011, having a filing date of Dec. 8, 2015, the entire contents of which are hereby incorporated by reference.

FIELD OF TECHNOLOGY

The following relates to a method and apparatus for determining a network topology of a hierarchical network, in particular of a hierarchical power supply network.

BACKGROUND

A network which is a power supply network or power transmission network can comprise a plurality of network nodes connected to each other hierarchically. Distribution system operators DSO in power grids or power supply networks are often confronted with the situation that their knowledge of the network topology of the power supply network is incomplete, defective or even absent. This is due to the fact that a distribution grid infrastructure has often grown over decades and there can be many modifications to the original setup due to extensions or repair/replacement activities which have not been sufficiently documented. Due to the large dimensions of the power supply network and the plurality of the network nodes, a manual verification of the underlying network topology has become out of reach or can only be undertaken under large expenses. Furthermore, distribution systems or power supply systems generally lack sufficient monitoring infrastructure which can indicate inconsistencies in the estimated network topology of the respective power supply network. Consequently, the identification of errors in an estimated network topology of a hierarchical network is so far unsystematic and happens incidentally.

SUMMARY

An aspect relates to providing a method and an apparatus for determining a network topology of a hierarchical network sufficiently.

Embodiments of the invention provide according to the first aspect of the present invention a method for determining a network topology of a hierarchical network, the method comprising the steps of providing an outage state matrix representing an outage state of leaf nodes at the lowest hierarchical level of said hierarchical network, decomposing the state matrix into a first probability matrix indicating for each inner node of said hierarchical network the probability that the respective inner node forms the origin of an outage at the lowest hierarchical level of said hierarchical network and into a second probability matrix indicating for each leaf node at the lowest hierarchical level of said hierarchical network the probability that an inner node forms a hierarchical superordinate node of the respective leaf node at the lowest hierarchical level of said hierarchical network and evaluating the second probability matrix to determine the network topology of said hierarchical network.

In a possible embodiment of the method according to the first aspect of the present invention a hierarchical network is a hierarchical power supply network.

In a still further possible embodiment of the method according to the first aspect of the present invention the hierarchical power supply network comprises at its lowest hierarchy level leaf nodes formed by smart meters generating event data streams indicating a current outage state of the leaf nodes of said power supply network.

In a possible embodiment of the method according to the first aspect of the present invention the generated event data streams are supplied to a processing unit which derives the outage state matrix from the received event data streams.

In a still further possible embodiment of the method according to the first aspect of the present invention each event data stream generated by a smart meter forming a leaf node of this hierarchical power supply network consists of event data triples.

In a possible embodiment of the method according to the first aspect of the present invention each event data triple of an event data stream comprises a timestamp indicating a time when an event is detected, a smart meter identifier identifying the smart meter generating the respective event data stream and an event identifier identifying an event type of the respective event.

In a possible embodiment of the method according to the first aspect of the present invention an outage state matrix derived from event data streams is a two-dimensional matrix, wherein the first dimension of said outage state matrix represents time and wherein the second dimension of said outage state matrix represents smart meters forming leaf nodes at the lowest hierarchical level of said power supply network.

In a still further possible embodiment of the method according to the first aspect of the present invention each column of the two-dimensional outage state matrix represents states of a respective smart meter at particular points in time and wherein each row of said outage state matrix represents the states of all smart meters at a particular point in time.

In a still further possible embodiment of the method according to the first aspect of the present invention the outage state matrix is a binary state matrix, wherein a first logical value indicates that the respective smart meter is in the outage state at a particular point in time and wherein a second logical value indicates that the respective smart meter is not in the outage state at a particular point in time.

In a further possible embodiment of the method according to the first aspect of the present invention event data streams generated by smart meters forming leaf nodes at the lowest hierarchical level of said hierarchical power supply network are transmitted continuously or periodically via a data network to a remote controller comprising a processing unit which derives the outage state matrix from the received event data streams and stores the derived outage state matrix in a memory unit for further processing.

In a still further possible embodiment of the method according to the first aspect of the present invention the determined network topology of the hierarchical network is output via a data or user interface.

Embodiments of the invention provide according to a second aspect an apparatus for determining a network topology of a hierarchical network, said apparatus comprising:
a memory unit adapted to store an outage state matrix representing an outage state of leaf nodes at the lowest hierarchical level of said hierarchical network and a processing unit adapted to decompose the stored state matrix into a first probability matrix indicating for each inner node of said hierarchical network the probability that the respective inner node forms the origin of an outage at the lowest hierarchical level of said hierarchical network and into a second probability matrix indicating for each leaf node at the lowest hierarchical level of said hierarchical network the probability that an inner node forms a hierarchical superordinate node of the respective leaf node at the lowest hierarchical level of said hierarchical network, wherein the decomposed second probability matrix is evaluated by the processing unit to determine the network topology of said hierarchical network.

Embodiments of the invention further provide according to a third aspect a network controller of a network comprising an apparatus according to the second aspect of embodiments of the present invention, wherein the processing unit of said network controller is adapted to derive the outage state matrix from event data streams received from smart meters of said network.

Embodiments of the invention further provide according to a fourth aspect a hierarchical power supply network comprising the network controller according to the third aspect of embodiments of the present invention, wherein said hierarchical power supply network comprises at its lowest hierarchical level leaf nodes formed by smart meters adapted to generate event data streams indicating a current outage state of the leaf nodes of the hierarchical power supply network.

In a possible embodiment of the hierarchical power supply network according to the fourth aspect of embodiments of the present invention the event data streams generated by smart meters forming leaf nodes at the lowest hierarchical level of said power supply network are transmitted via a data network to a data interface of the network controller of said hierarchical power supply network.

BRIEF DESCRIPTION

Figure 2:
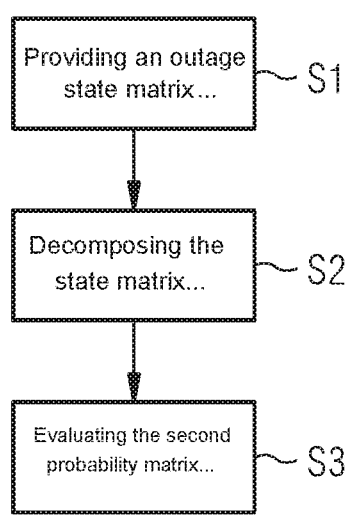
Figure 3:
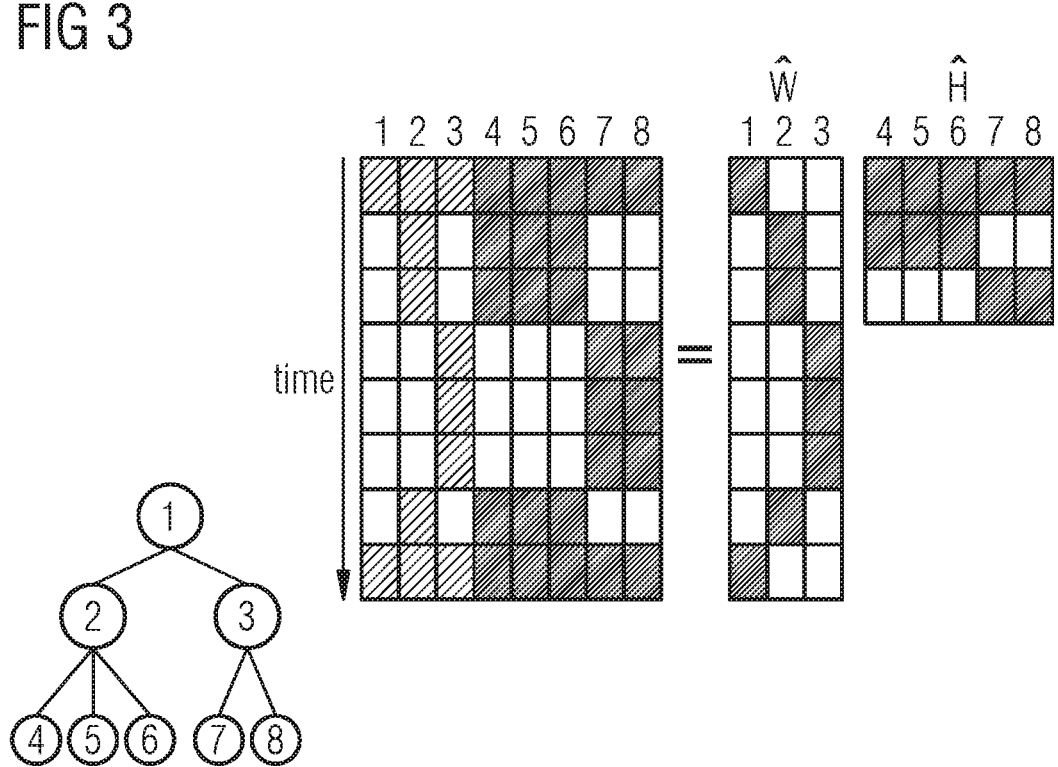

Some of the embodiments will be described in detail, with reference to the following figures, wherein like designations denote like members, wherein:

FIG. 1 shows a block diagram for illustrating a possible exemplary embodiment an apparatus for determining a network topology of a hierarchical network according to an aspect of the present invention;

FIG. 2 shows a flowchart of a possible exemplary embodiment of a method for determining a network topology of a hierarchical network according to a further aspect of the present invention; and FIG. 3 shows a schematic data representation and a factorization scheme which can be employed by a method and apparatus for determining a network topology of a hierarchical network according to the present invention.

DETAILED DESCRIPTION

As can be seen in FIG. 1 an apparatus 1 for determining a network topology NT of a hierarchical network comprises in the illustrated embodiment a memory unit 2 and a processing unit 3. The memory unit 2 is adapted to store an outage state matrix X representing an outage state of leaf nodes at the lowest hierarchical level of a hierarchical network 4 as shown in FIG. 1. The hierarchical network 4 can be a hierarchical power supply network which comprises a plurality of power nodes connected to each other hierarchically. Leaf nodes of such a hierarchical power supply network 4 are formed by smart meters 5 providing event data streams EDS to a processing unit 3 of the apparatus 1. The processing unit 3 is adapted to decompose the state matrix X stored in the memory unit 2 into a first probability matrix W and into a second probability matrix H. The first probability matrix W indicates for each inner node of the hierarchical network 4 the probability that the respective inner node forms the origin of an outage at the lowest hierarchical level of the hierarchical network. The second probability matrix H indicates for each leaf node at the lowest hierarchical level of the hierarchical network 4 the probability that an inner node forms a hierarchical superordinate node of the respective leaf node at the lowest hierarchical level of the hierarchical network 4. The processing unit 3 of the apparatus 1 is further adapted to evaluate the second probability matrix H to determine the network topology NT of the hierarchical network 4. The processing unit 3 is adapted to derive the outage state matrix X from event data streams EDS received from smart meters 5 of the hierarchical power supply network 4. The derived outage state matrix X can be stored by the processing unit 3 into the memory unit 2 for further processing.

The hierarchical power supply network 4 comprises at its lowest hierarchical level leaf nodes formed by smart meters 5 generating event data streams EDS indicating a current outage state of the respective leaf nodes of said power supply network 4. The generated event data streams EDS are supplied to the processing unit 3 which is adapted to derive the outage state matrix X from the received event data streams. In a possible embodiment the generated event data streams are supplied via a data network to the processing unit 3 of the apparatus 1. In a possible embodiment each event data stream EDS generated by a smart meter 5 of the power supply network 4 consists of event data triples. Each event data triple of the event data stream EDS can comprise in a possible embodiment a timestamp TS indicating a time when an event is detected, a smart meter identifier SM-ID identifying the respective smart meter 5 generating the respective event data stream EDS and an event identifier EV-ID identifying an event type of the respective event.

The state matrix X is derived by the processing unit 3 from the received event data streams EDS generated by multiple smart meters 5 within the power supply network 4. The derived outage state matrix X is in a possible embodiment a two-dimensional matrix, wherein the first dimension of said outage state matrix X represents time and wherein the second dimension of said outage state matrix X represents smart meters 5 forming leaf nodes of the lowest hierarchical level of the power supply network 4. Each column of the two-dimensional outage state matrix represents states of a specific smart meter 5 at particular points in time and each row of the outage state matrix X represents the states of all smart meters 5 at a particular point in time. In a possible embodiment the outage state matrix X is a binary state matrix, wherein a first logic value indicates that the respective smart meter 5 is in the outage state at a particular point in time and wherein a second logic value indicates that the respective smart meter 5 is not in the outage state of a particular point in time.

In a possible embodiment the event data streams EDS generated by the smart meters 5 forming leaf nodes at the lowest hierarchical level of the hierarchical power supply network 4 are transmitted continuously to the processing unit 3 of the apparatus 1. In an alternative embodiment the event data streams EDS generated by the smart meters 5 forming leaf nodes at the lowest hierarchical level of the hierarchical power supply network 4 are transmitted periodically to the processing unit 3 of the apparatus 1. Transmission of the event data streams EDS can in a possible embodiment be performed via a separate data network. In a possible embodiment the apparatus 1 is integrated in a remote network controller of the power supply network 4. The processing unit 3 of the network controller is adapted to derive the outage state matrix X from the received event data streams EDS and stores the derived outage state matrix X in the memory unit 2 of the apparatus 1 for further processing. The processing unit 3 can load the stored outage state matrix X and perform a decomposition of the loaded state matrix into a first probability matrix W and into a second probability matrix H. Then the processing unit 3 evaluates the decomposed second probability matrix H to determine the network topology NT of the hierarchical power supply network 4. The calculated network topology NT of the hierarchical power supply network 4 can be output by the processing unit 3 via a user interface or via a data interface. Accordingly, the apparatus 1 can determine the network topology NT of the hierarchical network 4 automatically based on the received plurality of event data streams EDS.

The present embodiments of the invention comprise according to a further aspect a network controller of a hierarchical power supply network 4 wherein the network controller is adapted to calculate the network topology NT of the power supply network 4 automatically based on event data streams EDS received from smart meters of the hierarchical power supply network 4 or leaf nodes of said hierarchical power supply network. The apparatus can perform a clustering applied to event data streams EDS of multiple smart meters 5 which identify hierarchical dependencies within the hierarchical network 4. Event data streams EDS are used to identify the hierarchical dependencies, i.e. dependencies between leaf nodes, parent or superordinate nodes up to a root node of the hierarchical power supply network 4. Identification of the hierarchical dependencies can be performed for each smart meter within a tree topology of the hierarchical power supply network 4, wherein each smart meter 5 forms a leaf node at the lowest hierarchical level of the power supply network 2. The total number of clusters can equal the number of network nodes in the tree topology of the power supply network 4 and the number of assigned clusters per smart meter 5 can equal the number of its parent nodes in the topology up to the root node of the hierarchical power supply network 4.

The event data stream EDS of each smart meter 5 can consist or comprise in a possible embodiment of a triple (timestamp TS, smart meter ID and event ID), wherein the event ID takes two values representing an outage event where the smart meter 5 detects a power loss and/or a restoration event where the smart meter 5 detects a restoration of power. In a possible embodiment the event data triples of all smart meters 5 can be sorted by the timestamp TS in an ascending order and converted into a sparse binary outage state matrix $X \in \{0,1\}^{m \times n}$, wherein each column of the sparse binary outage state matrix X represents the state of the respective smart meter 5 at particular points in time. The first dimension of the state matrix X represents the time and the second dimension of the state matrix represents the smart meters. While iterating over the sorted event data triples, a new row can be appended at the bottom of the outage state matrix X whenever any of the smart meters 5 records an event and optionally repeated in regular time intervals in between provided at least one smart meter is in the outage state. The new row captures the state of all smart meters 5 at a particular instant according to a predetermined encoding scheme as described above. All zero rows of the outage state matrix X, i.e. where no smart meter 5 is in the outage state at a particular point in time, can be omitted. The resulting representation is typically very sparse, because only a small fraction of the smart meters 5 is in an outage state at a particular point in time. By storing only the non-zero values, i.e. high logic values indicating that the respective smart meter 5 is in the outage state, the data representation is feasible for encoding outage information of power supply networks even with a very large number of smart meters 5.

The tree topology of the hierarchical network 4 can be identified from the outage state matrix X by performing a matrix factorization. In the matrix factorization performed by the processing unit 3 of the apparatus 1 the outage state matrix X is decomposed into two different matrices $\hat{W}$, $\hat{H}$. The first probability matrix $\hat{W}$ indicates for each inner node of the hierarchical network 4 the probability that the respective inner node forms the origin of an outage at the lowest hierarchical level of said hierarchical network 4. The second probability matrix $\hat{H}$ indicates for each leaf node at the lowest hierarchical level of the hierarchical network 4 the probability that an inner node forms a hierarchical superordinate node of the respective leaf node at the lowest hierarchical level of said hierarchical network 4. $\hat{W} \in [0,1]^{m \times r}$ and $H \in [0,1]^{r \times n}$ with r being the number of non-leaf nodes or superordinate nodes in the tree topology of the hierarchical network, wherein $\hat{W}\hat{H}=X$, i.e. the outage state matrix. Each row of $\hat{W}$ contains only non-negative values and sums up to 1. The first probability matrix represents the probability that the kth non-leaf node is the root cause or origin of an outage at time index i. Constraining $\Sigma_k \hat{W}_{ik}=1$ implies mutually exclusive outage root causes which is an admissible assumption for a power supply network. The value $\hat{H}_{kj}$ represents the probability that the kth non-leaf node is a superordinate node of the jth smart meter forming a leaf node at the lowest hierarchical level. Thus, $\hat{X}_{ij}=\Sigma_k \hat{W}_{ik}\hat{H}_{kj}$ is the probability that an outage has been observed at the jth smart meter 5 at time index i. To ensure that the value ranges of $\hat{W}$ and $\hat{H}$ as well as the row sum constraint enforced on $\hat{W}$ are satisfied, the two matrices are parameterized as $$\hat{W}_{ij} = [\text{softmax}(W_{i,:})]_j = \frac{\exp(W_{ij})}{\sum_k \exp(W_{ik})} \text{ and } \hat{H}_{kj} = \text{logistic}(H_{kj}) = \frac{1}{1+\exp(-H_{kj})}.$$

The values of the parameter matrices W and H can be determined in a possible embodiment through maximum log-likelihood estimation by minimizing the cross-entropy between the target value $X_{ij}$ and the estimated value $\hat{X}_{ij}$, i.e. the differentiable objective $E(W, H)=E_{ij}[X_{ij} \log(\hat{X}_{ij})+(1-X_{ij}) \log(1-\hat{X}_{ij})]$ is minimized via a gradient-based optimization method. Scalability of the method and robustness of the optimization algorithm against convergence to local optima can be achieved by performing lock-free multithreaded stochastic optimization and by introducing additional noise to the update direction similar to simulated annealing.

The following table depicts a learning algorithm and can be used by a method according to an aspect of the present embodiments of the invention in a possible implementation.

--- function FACTORIZE(X $\in \{0,1\}^{m \times n}$, r $\in \mathbb{N}$, $\alpha \in \mathbb{R}^+$, p $\in ]0.5,1]$)
    Initialize W $\in \mathbb{R}^{m \times r}$ and H $\in \mathbb{R}^{r \times n}$ at random
    while not converged do
        Draw i $\in \{1, \ldots, m\}$ uniformly at random Draw $j \in \{1, \ldots, n\}$ uniformly at random
Draw $\beta \in \{-1, 1\}$ at random with $P[\beta = 1] = p$
Compute forward pass $$\hat{W}_{ik} \leftarrow \frac{\exp(W_{ik} - \max_t W_{it})}{\sum_l \exp(W_{il} - \max_t W_{it})}$$

$$\hat{H}_{kj} \leftarrow \frac{1}{1 + \exp(-H_{kj})}$$

$$\hat{X}_{ij} \leftarrow \sum_k \hat{W}_{ik} \hat{H}_{kj}$$

Compute error
$E \leftarrow X_{ij} \ln(\hat{X}_{ij}) - (1 - X_{ij}) \ln(1 - \hat{X}_{ij})$
Compute backward pass $$\frac{\partial E}{\partial \hat{X}_{ij}} \leftarrow \frac{1 - X_{ij}}{1 - \hat{X}_{ij}} - \frac{X_{ij}}{\hat{X}_{ij}}$$

$$\frac{\partial E}{\partial \hat{W}_{ik}} \leftarrow \frac{\partial E}{\partial \hat{X}_{ij}} \hat{H}_{kj}$$

$$\frac{\partial E}{\partial W_{ik}} \leftarrow \frac{\partial E}{\partial \hat{W}_{ik}} \hat{W}_{ik} - \hat{W}_{ik} \sum_l \frac{\partial E}{\partial \hat{W}_{il}} \hat{W}_{il}$$

$$\frac{\partial E}{\partial \hat{H}_{kj}} \leftarrow \frac{\partial E}{\partial \hat{X}_{ij}} \hat{W}_{ik}$$

$$\frac{\partial E}{\partial H_{kj}} \leftarrow \frac{\partial E}{\partial \hat{H}_{kj}} \hat{H}_{kj}(1 - \hat{H}_{kj})$$

Update parameters $$W_{ik} \leftarrow W_{ik} - \beta \alpha \frac{\partial E}{\partial W_{ik}}$$

$$W_{ik} \leftarrow W_{ik} - \frac{1}{r} \sum_l W_{il}$$

$$H_{kj} \leftarrow H_{kj} - \beta \alpha \frac{\partial E}{\partial H_{kj}}$$

where r indicates the number of non-leaf nodes, $\alpha$ is the learning rate, and, $\beta$ determines the sign of the current update direction under the above-described noisy update scheme.

The above algorithm performs a matrix factorization for a tree topology identification based on binary event data. The updates can be executed in parallel without locking. After the optimization process has converged, the network topology NT can be inferred from the cluster membership matrix $\hat{H}$ forming the second probability matrix.

The set of edges of the network topology NT of the hierarchical network 4 can be determined using the following algorithm. In a possible implementation of the method and apparatus according to the present invention the following algorithm is employed to infer the network topology NT of the power supply network 4 from the second probability matrix $\hat{H}$. The algorithm can yield the edges of a graph where the non-leaf nodes are labelled $\{1, \ldots, r\}$ and the leaf nodes are labelled $\{r+1, \ldots, r+n\}$.

function INFERTOPOLOGY($\hat{H} \in [0,1]^{r \times n}$, $\gamma \in ]0,1[$)
  Binarize $\hat{H}$ using threshold $\gamma$ $$\mathcal{H}_{kj} \leftarrow \begin{cases} 1 & \text{if } \hat{H}_{kj} \geq \gamma \\ 0 & \text{if } \hat{H}_{kj} < \gamma \end{cases} \forall k, j$$

Get frequency of each cluster $$f_{\mathcal{H}} \leftarrow \sum_{j=1}^{n} \mathcal{H}_{\cdot j}$$

Set of edges in the graph denoted by tuples (parent,child)
  $E \leftarrow \{\}$
  Infer topology;iterate over leaf nodes
  for $j \leftarrow 1, \ldots, n$ do
    Store indices of nonzero entries in $\mathcal{H}_{\cdot j}$
    $P \leftarrow [k | k \leftarrow 1, \ldots, r \wedge \mathcal{H}_{kj} = 1]^T$
    Store frequencies of the entries in P
    $f_P \leftarrow [(f_{\mathcal{H}})_{P_i} | i \leftarrow 1, \ldots, \dim(P)]^T$
    Compute child node
    $c \leftarrow r + j$
    for $i \leftarrow \text{argsort}(f_P)$ in ascending order of $f_P$ do
      $p \leftarrow P_i$
      $E \leftarrow E \cup \{(p, c)\}$
      $c \leftarrow p$
  return E FIG. 3 depicts a data representation as well as a factorization scheme that can be employed by the method and apparatus according to embodiments of the present invention for a simple exemplary hierarchical network comprising eight network nodes connected to each other in three hierarchical levels. As can be seen in FIG. 1, the exemplary simple network comprises a root node 1 connected to two intermediate superordinate nodes 2, 3 each having leaf nodes, wherein leaf nodes 4, 5, 6 are connected to superordinate nodes 2 and leaf nodes 7, 8 are connected to superordinate node 3. The intermediate nodes 2, 3 are both connected to the root node 1. In FIG. 3 columns 1 to 3 of the left-hand side matrix represent observations made by the non-leaf nodes of the network which are not accessible in practice. Only using columns 4 to 8 which comprise observations made by the smart meters forming leaf nodes of the hierarchical network, the first probability matrix $\hat{W}$ and the second probability matrix $\hat{H}$ can be obtained through factorization using the algorithm depicted in the first table above. After having decomposed the state matrix X, the second probability matrix $\hat{H}$ is evaluated automatically to determine or calculate the network topology NT of the hierarchical network. This is performed in a possible implementation using the algorithm as depicted in table 2 above.

The calculated network topology NT can be output at a data interface of the processing unit 3 to a further evaluation unit for further processing of the derived network topology NT of the hierarchical network 4. Further, the calculated network topology NT can be output via a user interface to an operator of the power supply network 4. The method and apparatus according to embodiments of the present invention can be used for determining the network topology NT of any kind of hierarchical network. The data generated by the multiple smart metering devices of the power supply network provides a massive amount of data that can be used by the method according to embodiments of the present invention to calculate automatically the network topology NT of the respective network. The method identifies automatically the tree topology of a hierarchical power supply network 4 based on outage events recorded by the smart meter devices 5 forming leaf nodes of the hierarchical power supply network 4.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for determining a network topology of a hierarchical network, the method comprising the steps of:
    (a) providing an outage state matrix representing an outage state of leaf nodes at a lowest hierarchical level of said hierarchical network;
    (b) decomposing the outage state matrix into a first probability matrix indicating for each inner node of said hierarchical network a first probability that the respective inner node forms an origin of an outage at the lowest hierarchical level of said hierarchical network and into a second probability matrix indicating for each leaf node at the lowest hierarchical level of said hierarchical network a second probability that an inner node forms a hierarchical superordinate node of the respective leaf node at the lowest hierarchical level of said hierarchical network; and
    (c) evaluating the second probability matrix to determine the network topology of said hierarchical network.

2. The method according to claim 1, wherein the hierarchical network is a hierarchical power supply network.

3. The method according to claim 2, wherein the hierarchical power supply network comprises at its lowest hierarchy level leaf nodes formed by smart meters generating event data streams indicating a current outage state of the leaf nodes of said hierarchical power supply network.

4. The method according to claim 3, wherein the generated event data streams are supplied to a processing unit which derives the outage state matrix from the received event data streams.

5. The method according to claim 3, wherein each event data stream generated by a smart meter forming a leaf node of said hierarchical power supply network consists of event data triples.

6. The method according to claim 5, wherein each event data triple of an event data stream comprises a timestamp indicating a time when an event is detected; a smart meter identifier identifying the smart meter generating the respective event data stream and an event identifier identifying an event type of the respective event.

7. The method according to claim 2, wherein the outage state matrix derived from event data streams is a two-dimensional matrix, wherein a first dimension of said outage state matrix represents time and wherein the second dimension of said outage state matrix represents smart meters forming leaf nodes at the lowest hierarchical level of said hierarchical power supply network.

8. The method according to claim 7, wherein each column of said two-dimensional outage state matrix represents states of a respective smart meter at particular points in time and wherein each row of said outage state matrix represents the states of all smart meters at the particular point in time.

9. The method according to claim 7, wherein the outage state matrix is a binary state matrix, wherein a first logic value indicates that the respective smart meter is in the outage state at a particular point in time; and wherein a second logic value indicates the respective smart meter is not in the outage state at the particular point in time.

10. The method according to claim 2, wherein event data streams generated by smart meters forming leaf nodes at the lowest hierarchy level of said hierarchical power supply network are transmitted continuously or periodically via a data network to a remote controller comprising a processing unit which derives the outage state matrix from the received event data streams and stores the derived outage state matrix in a memory unit for further processing.

11. The method according to claim 1, wherein the determined network topology of the hierarchical network is output via a user interface.

12. An apparatus for determining a network topology of a hierarchical network, said apparatus comprising:
    (a) a memory unit adapted to store an outage state matrix representing an outage state of leaf nodes at a lowest hierarchical level of said hierarchical network; and
    (b) a processing unit adapted to decompose the stored outage state matrix into a first probability matrix indicating for each inner node of said hierarchical network a first probability that the respective inner node forms an origin of an outage at the lowest hierarchical level of said hierarchical network and into a second probability matrix indicating for each leaf node at the lowest hierarchical level of said hierarchical network the a second probability that an inner node forms a hierarchical superordinate node of the respective leaf node at the lowest hierarchical level of said hierarchical network,
    wherein the decomposed second probability matrix is evaluated by said processing unit to determine the network topology of said hierarchical network.

13. A network controller of a network comprising the apparatus according to claim 12, wherein the processing unit of said network controller is adapted to derive the outage state matrix from event data streams received from smart meters of said hierarchical network.

14. A hierarchical power supply network comprising the network controller according to claim 13, wherein said hierarchical power supply network comprises at its lowest hierarchical level leaf nodes formed by smart meters adapted to generate event data streams indicating a current outage state of the leaf nodes of the hierarchical power supply network.

15. The hierarchical power supply network according to claim 14, wherein the event data streams generated by the smart meters forming the leaf nodes at the lowest hierarchical level of said hierarchical power supply network are transmitted via a data network to a data interface of the network controller of said hierarchical power supply network.

* * * * *